(12) United States Patent
Amiri et al.

(10) Patent No.: US 9,380,604 B1
(45) Date of Patent: Jun. 28, 2016

(54) OPPORTUNISTIC CONCURRENCY BETWEEN WIRELESS LOCAL AREA NETWORKS

(71) Applicant: Quantenna Communications, Inc., Fremont, CA (US)

(72) Inventors: Bahador Amiri, Saratoga, CA (US); Hossein Dehghan, Diablo, CA (US); Steve Schultz, Danville, CA (US)

(73) Assignee: Quantenna Communications, Inc., Fremont, CA (US)

( * ) Notice: Subject to any disclaimer, the term of this patent is extended or adjusted under 35 U.S.C. 154(b) by 0 days.

(21) Appl. No.: 14/881,138

(22) Filed: Oct. 12, 2015

Related U.S. Application Data

(60) Provisional application No. 62/062,915, filed on Oct. 12, 2014.

(51) Int. Cl.
| | | |
|---|---|---|
| *G06F 15/173* | (2006.01) | |
| *H04W 74/08* | (2009.01) | |
| *H04B 7/04* | (2006.01) | |
| *H04B 17/318* | (2015.01) | |
| *H04W 52/24* | (2009.01) | |
| *H04B 17/336* | (2015.01) | |
| *H04B 7/06* | (2006.01) | |
| *H04W 84/12* | (2009.01) | |

(52) U.S. Cl.
CPC ......... *H04W 74/0816* (2013.01); *H04B 7/0413* (2013.01); *H04B 7/0617* (2013.01); *H04B 17/318* (2015.01); *H04B 17/336* (2015.01); *H04W 52/243* (2013.01); *H04W 84/12* (2013.01)

(58) Field of Classification Search
CPC .............................. H04W 72/02; H04W 84/18
See application file for complete search history.

(56) References Cited

U.S. PATENT DOCUMENTS

| | | |
|---|---|---|
| 8,111,790 B2 | 2/2012 | Farrokh |
| 8,305,921 B2 | 11/2012 | Narasimhan |
| 8,358,588 B2 | 1/2013 | Goldsmith |

(Continued)

OTHER PUBLICATIONS

S. Schelstraete; H. Dehghan; "Wireless Home Network Supporting Concurrent Links to Legacy Devices", Unpublished Utility U.S. Appl. No. 14/187,318, filed Feb. 23, 2014.

(Continued)

*Primary Examiner* — David Oveissi
(74) *Attorney, Agent, or Firm* — IP Creators; Charles C Cary

(57) ABSTRACT

A wireless transceiver apparatus configured to support wireless communications with transceiver nodes on a wireless local area network (WLAN). The wireless transceiver apparatus includes: transmit and receive path components and an opportunistic link controller. The opportunistic link controller includes: a carrier sensor module, a dominant link identifier module, and a concurrent link selector module. The carrier sensor module senses availability of the selected communication channel. The dominant link identifier module is responsive to a determination of carrier unavailability by the carrier sensor module and configured to identify carrier unavailability arising from a remote link on a neighboring WLAN. The concurrent link selector module is responsive to the identification of carrier unavailability arising from the remote link and configured to transmit a concurrent communication link to a corresponding one of the transceiver nodes on the associated WLAN which avoids interference with the remote link.

18 Claims, 11 Drawing Sheets

(56) References Cited

U.S. PATENT DOCUMENTS

| | | | |
|---|---|---|---|
| 8,937,884 B2 | 1/2015 | Goldsmith | |
| 2009/0285116 A1* | 11/2009 | Nanda | H04W 72/02 370/252 |
| 2010/0074190 A1 | 3/2010 | Cordeiro et al. | |
| 2011/0116489 A1 | 5/2011 | Grandhi | |
| 2012/0320759 A1* | 12/2012 | Shao | H04W 24/02 370/242 |
| 2013/0017794 A1* | 1/2013 | Kloper | H04W 74/0808 455/63.1 |
| 2013/0170533 A1 | 7/2013 | Khojastepour et al. | |

OTHER PUBLICATIONS

S. Heidari; B. Amiri; "Wireless Home Network Supporting Discrete Concurrent Communication Links"; Unpublished Utility U.S. Appl. No. 14/198,957, filed Mar. 6, 2014.

G. Caire; K Psounis; "Composite Beamforming to Coordinate Concurrent WLAN Links"; Unpublished Utility U.S. Appl. No. 14/612,293, filed Feb. 2, 2015.

* cited by examiner

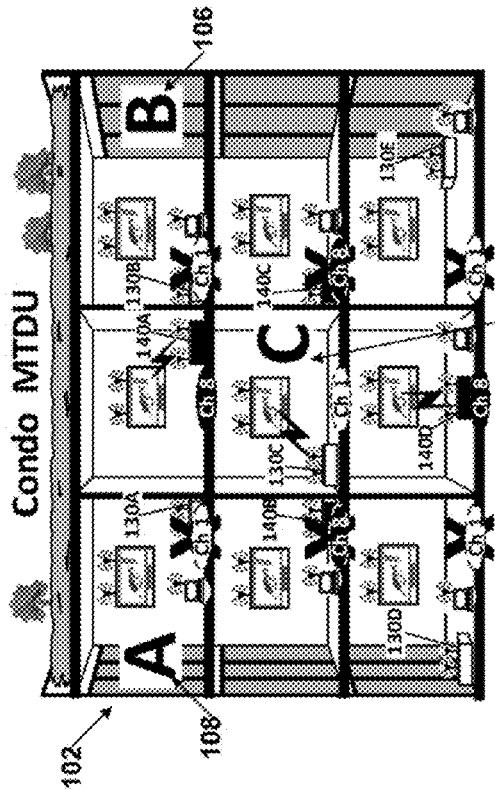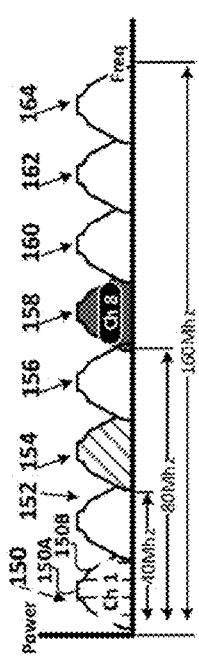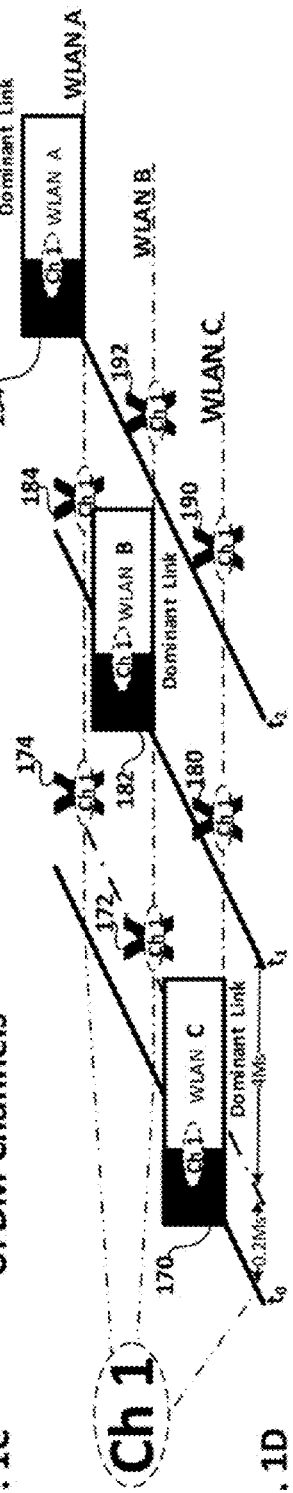
FIG. 1A
FIG. 1B
FIG. 1C
FIG. 1D

Concurrent use of Shared Channel among Neighbor WLANs

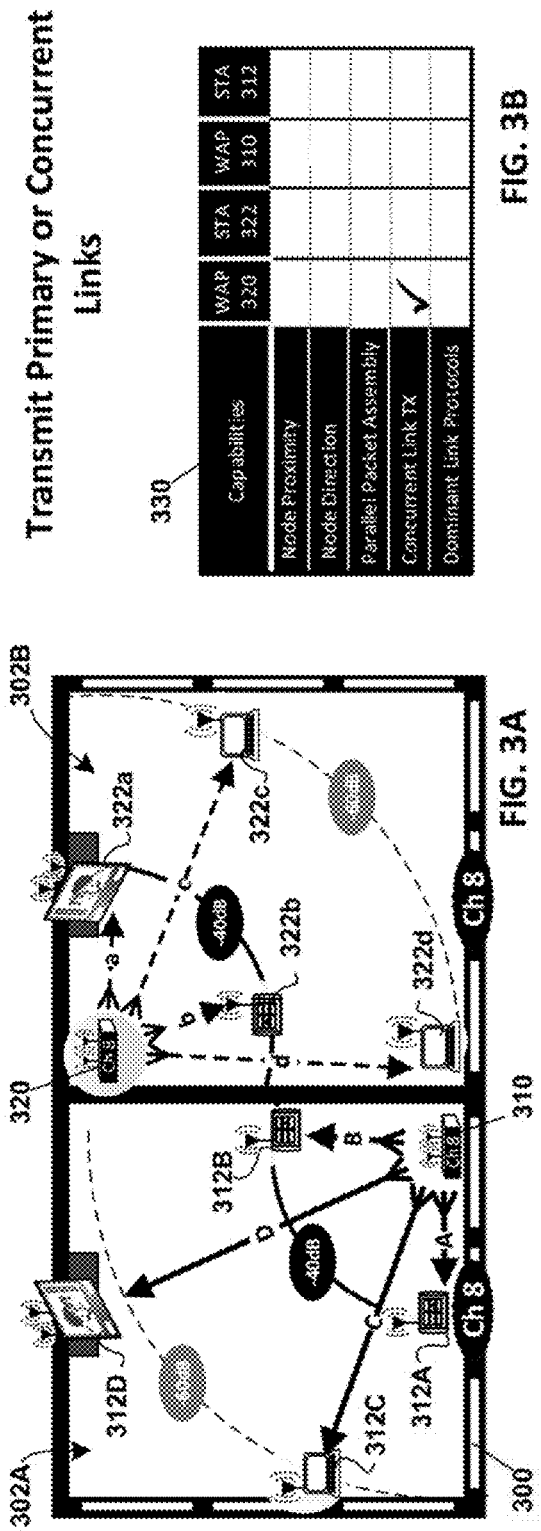
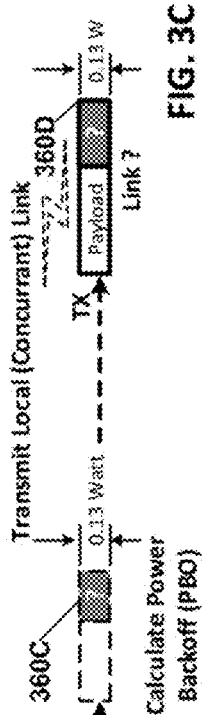
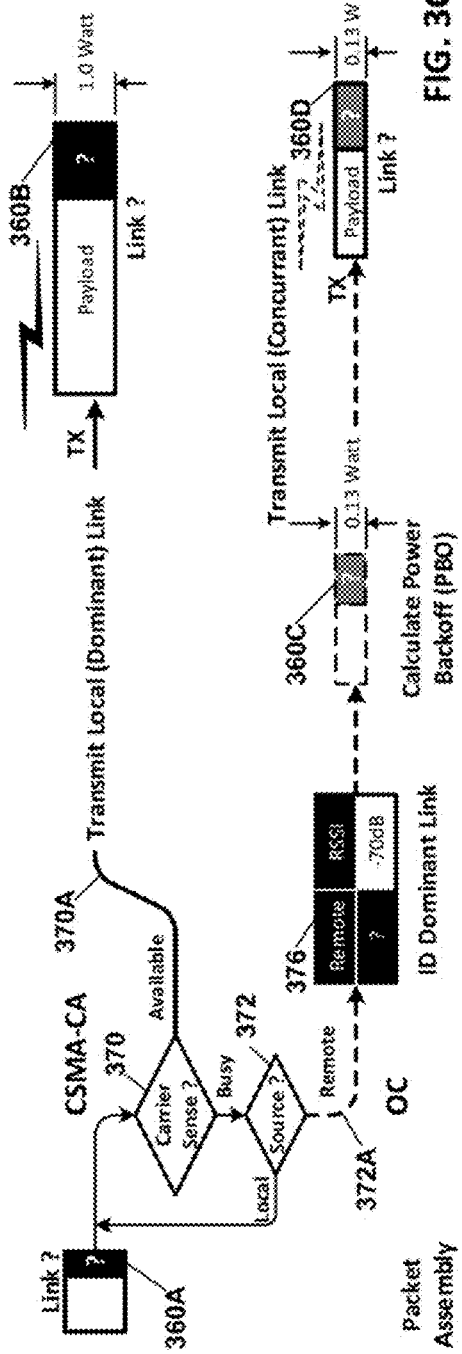
FIG. 3A
FIG. 3B
FIG. 3C

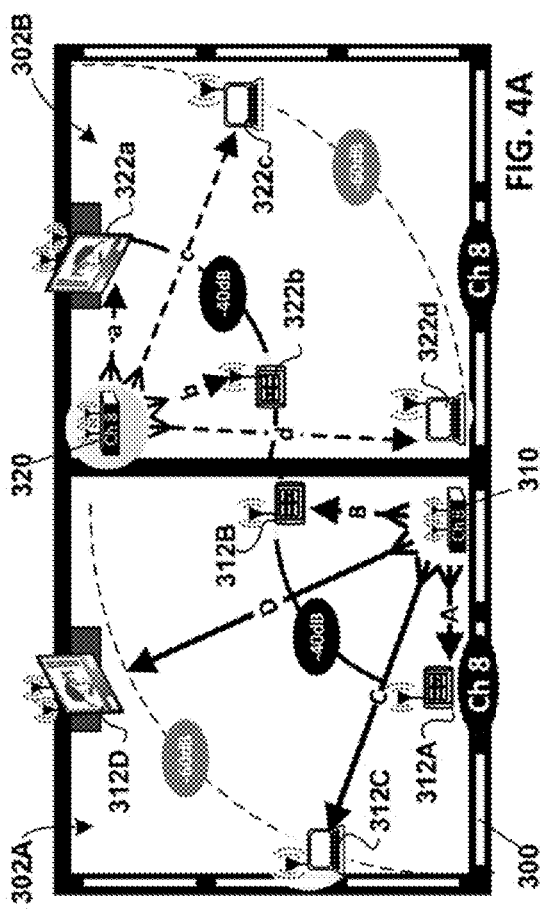
FIG. 4A
FIG. 4B
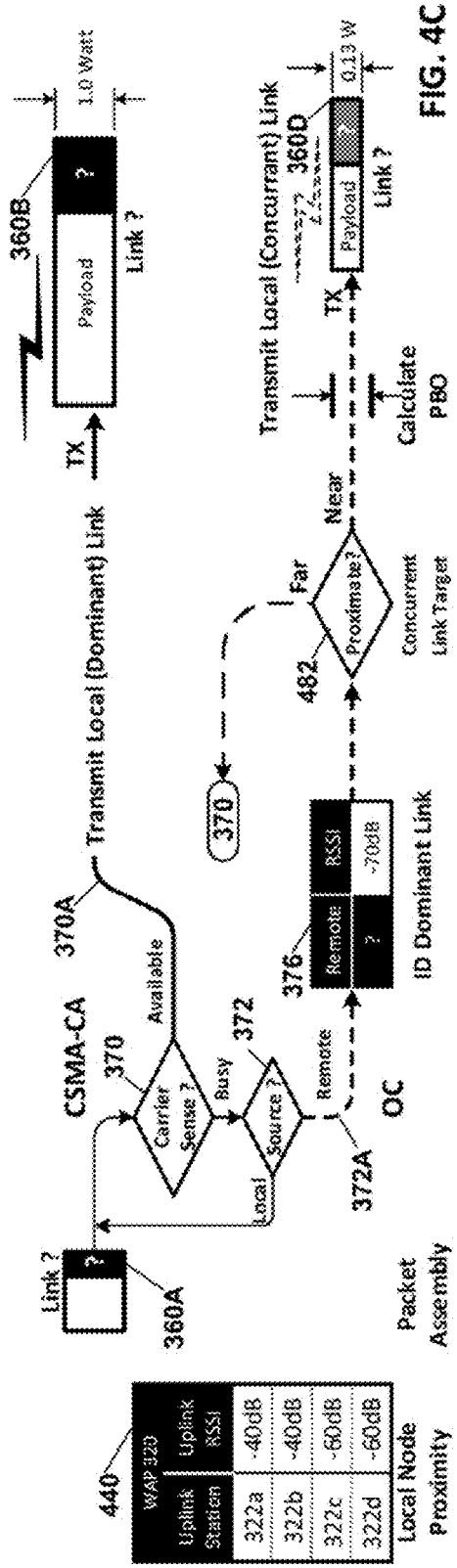
FIG. 4C

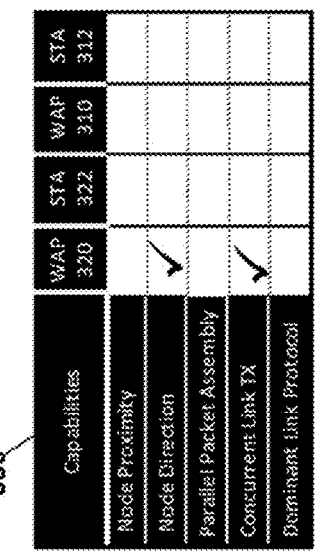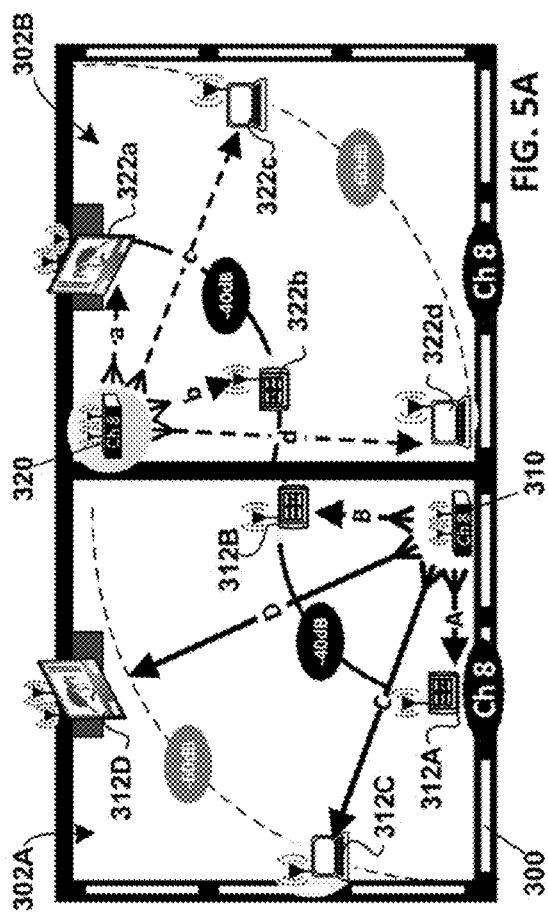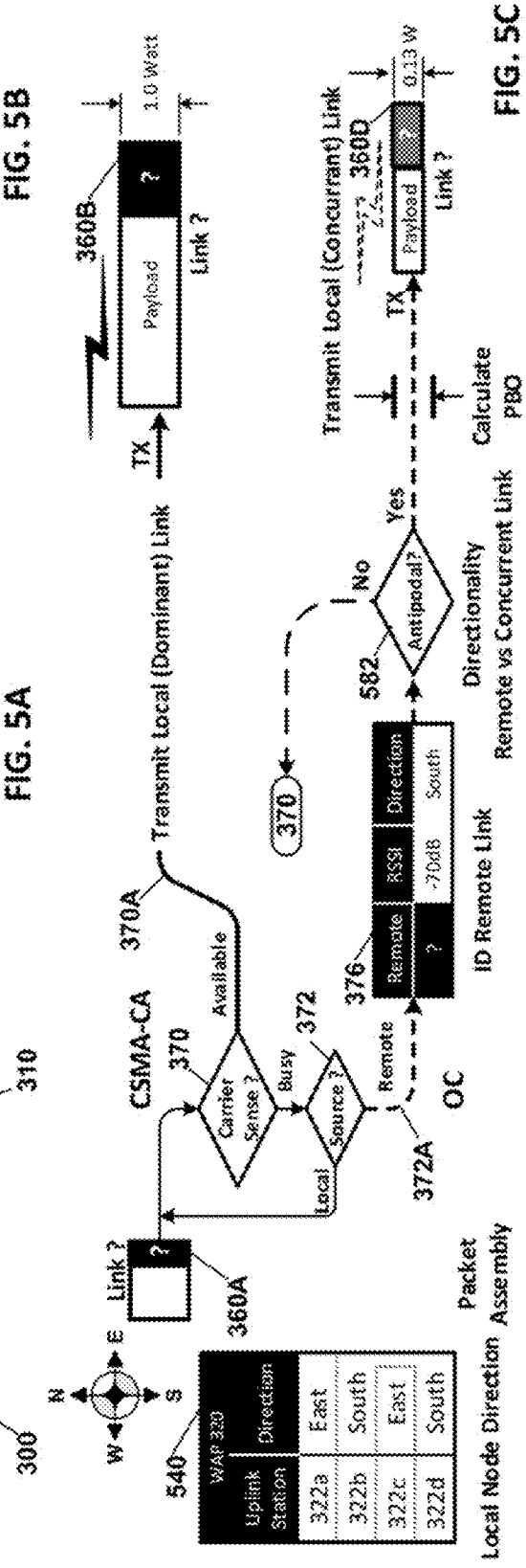

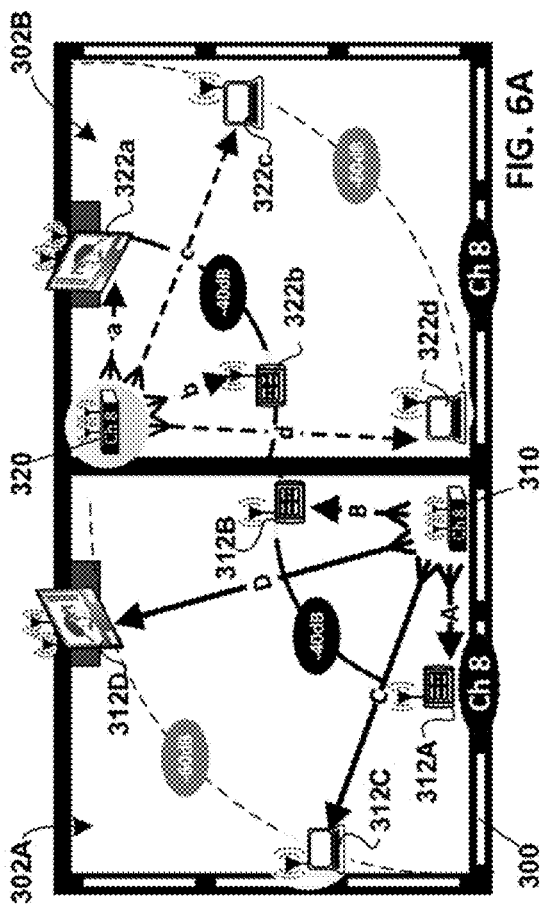
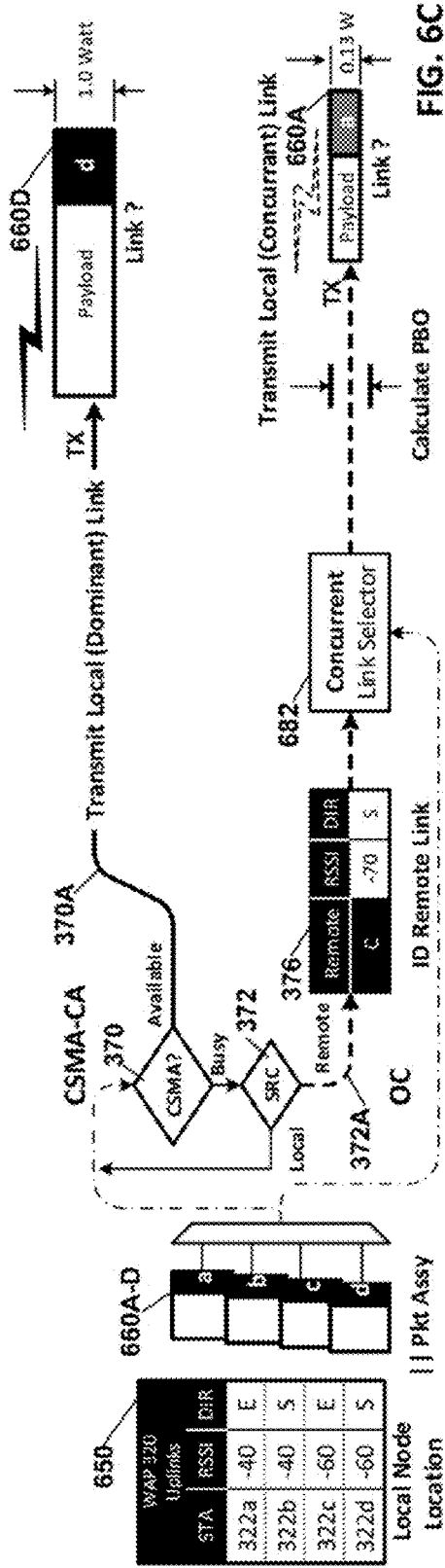
FIG. 6A
FIG. 6B
FIG. 6C

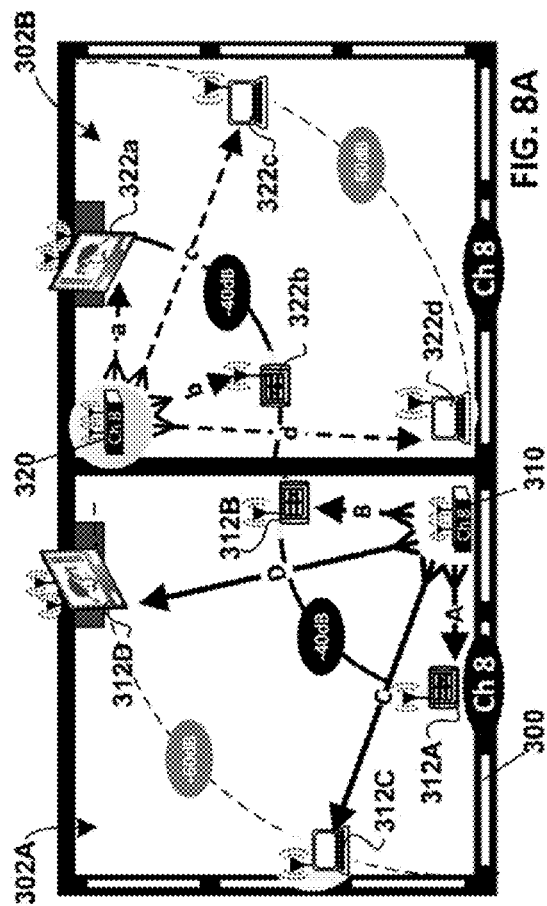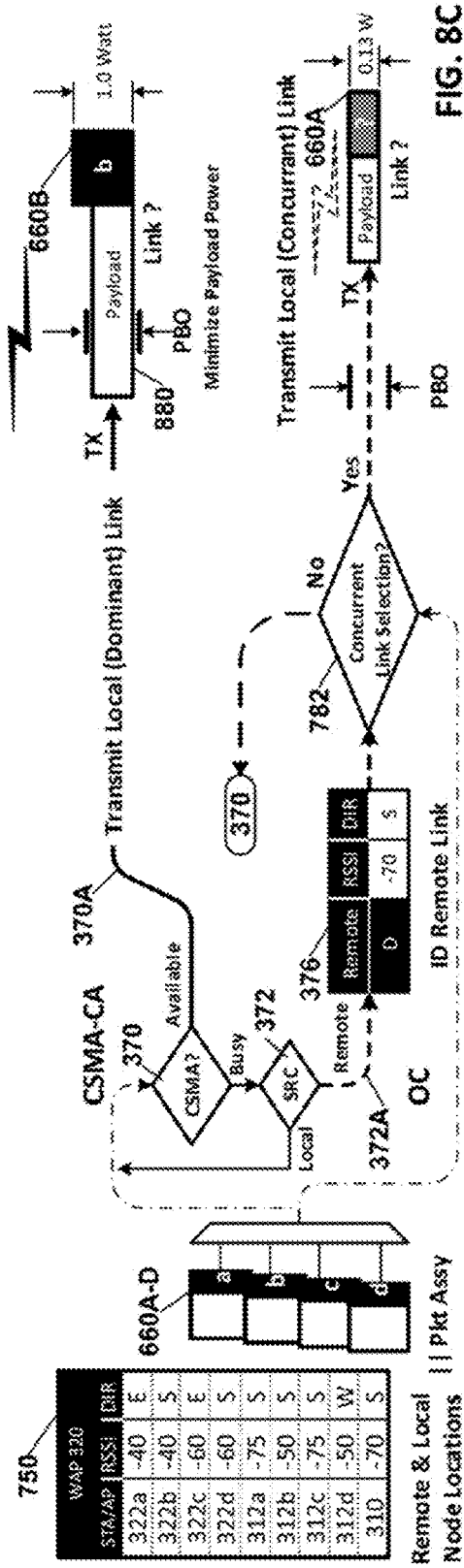

WLAN Node Location Determination

Opportunistic Concurrency

OPPORTUNISTIC CONCURRENCY BETWEEN WIRELESS LOCAL AREA NETWORKS

CROSS REFERENCE TO RELATED APPLICATION

This application claims the benefit of prior filed Provisional Application No. 62/062,915 filed on Oct. 12, 2014 entitled "Method and Apparatus for Network Self-Healing based on Interference State" which is incorporated herein by reference in its entirety as if fully set forth herein.

BACKGROUND OF THE INVENTION

1. Field of Invention

The field of the present invention relates in general to wireless local area networks including wireless access points (WAP) and wireless stations and methods of increasing concurrent communications thereon.

2. Description of the Related Art

Wireless networks, a.k.a. wireless local area networks (WLAN) are established using multiple centrally controlled devices called Wireless Access Points (WAP)s. Each WAP wirelessly couples all associated devices, e.g. wireless stations such as: computers, printers, televisions, security cameras across the entire enterprise to one another and to the Internet. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the protocols, e.g. "a", "b", "g", "n", "ac", "ad" specified in the IEEE 802.11 standard. Communications follow a hub and spoke model with each WAP at the hub and the spokes corresponding to the wireless links to each 'client' device. A communication between from a transmitting WAP and one of its associated receiving stations is identified as a downlink communication. Conversely, a communication from a transmitting station to its receiving WAP with which it is associated is identified as an uplink communication.

Each WAP uses a selected communication channel to support communications with its associated stations on the Wireless Local Area Network (WLAN) formed thereby. Access to the communication channel utilized by each WLAN relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use. A WLAN operative in this manner is said to implement: CSMA\CA where the "CA" moniker signifies collision avoidance as the connectionless access coordination methodology.

Communications on the single communication medium are identified as "simplex" meaning, communications from a single source node to one target node at one time, with all remaining nodes capable of "listening" to the subject transmission. Starting with the IEEE 802.11ac standard and specifically 'Wave 2' thereof, discrete communications from a single WAP to more than one target station at the same time may take place using what is called Multi-User (MU) multiple-input multiple-output (MIMO) capability of the WAP. MU capabilities were added to the standard to enable the WAP to communicate with multiple single antenna single stream stations concurrently.

In dense wireless environments, such as Auditoriums, Offices, Condominiums and Apartments there may be hundreds of WAPs each supporting communications of hundreds of associated wireless stations and the Internet. Typically, each WAP will try to select different channels. This allows concurrent communications to take place on different channels while still maintaining compliance with the CSMA\CA protocol. Unfortunately, such throughput improvements achieved by frequency separation come at the price of decreased bandwidth for communications, which of course has its own countervailing effect on throughput. This tradeoff is particularly noticeable in the more recent IEEE 802.11 compliant protocols such as 802.11ac. This protocol allows channel aggregation of the many discrete 20 Mhz channels into aggregate channels totaling 160 Mhz. This broad bandwidth may be required for wireless video conferencing devices and other low latency high throughput enterprise devices. Thus each WAP is in selecting channels, left with the tradeoffs between frequency separation with proximate WAPs at the price of decreased bandwidth.

What is needed are improved methods for increased throughput of wireless local area networks (WLAN).

SUMMARY OF THE INVENTION

The present invention provides a system, method and apparatus for increasing overall communication throughput on wireless local area network (WLAN) comprising a plurality of multiple-input multiple-output (MIMO) Wireless Access Points (WAP)s communicating with associated stations which are all compliant, with one or more of the protocols e.g. "a", "b", "g", "n", "ac", "ad", "ax" within the IEEE 802.11 standard.

In an embodiment of the invention a wireless transceiver apparatus configured to support multiple-input multiple-output (MIMO) wireless communications with a plurality of transceiver nodes on a plurality of orthogonal frequency-division multiplexed (OFDM) sub-channels of a selected one of a plurality of communication channels on an associated wireless local area network (WLAN) is disclosed. The wireless transceiver apparatus includes: a plurality of components coupled to one another to form transmit and receive paths for processing wireless communications on the selected communication channel; and an opportunistic link controller. The opportunistic link controller includes: a carrier sensor module, a dominant link identifier module, and a concurrent link selector module. The carrier sensor module is configured to sense availability and unavailability of the selected communication channel based on a relationship between a sensed signal level on the selected communication channel and a clear channel assessment (CCA) threshold level. The dominant link identifier module is responsive to a determination of carrier unavailability by the carrier sensor module and configured to identify carrier unavailability arising from a remote link on a neighboring WLAN. The concurrent link selector module is responsive to the identification of carrier unavailability arising from the remote link by the dominant link identifier and configured to transmit a concurrent communication link to a corresponding one of the transceiver nodes on the associated WLAN, and the concurrent communication link transmission configured to avoid interference above the CCA threshold level with the remote link, thereby increasing throughput on the associated WLAN.

The invention may be implemented in hardware, firmware or software.

Associated apparatus and methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 1A-D are respectively prior art elevation views, a channel bandplan, and a timing diagram for a representative prior art wireless local area networks (WLANs);

FIGS. 3A-C are respectively a plan view, a data table view, and a transmission workflow for a wireless transceiver operative in accordance with an embodiment of the invention for concurrent link transmission;

FIGS. 4A-C are respectively the plan view, the data table view, and the transmission workflow shown in FIGS. 3A-C including additional workflow associated with node proximity detection in accordance with an embodiment of the invention;

FIGS. 5A-C are respectively the plan view, the data table view, and the transmission workflow shown in FIGS. 3A-C including additional workflow associated with node direction detection in accordance with an embodiment of the invention;

FIGS. 6A-C are respectively the plan view, the data table view, and the transmission workflow shown in FIGS. 3A-C including additional workflow associated with node direction and proximity detection and concurrent link selection in accordance with an embodiment of the invention;

FIGS. 8A-C are respectively the plan view, the data table view, and the transmission workflow shown in FIGS. 7A-C including additional workflow associated with transmission of a dominant link according to a set of protocols which enhance opportunistic concurrency for neighboring networks;

DETAILED DESCRIPTION OF THE EMBODIMENTS

Figure 2B:
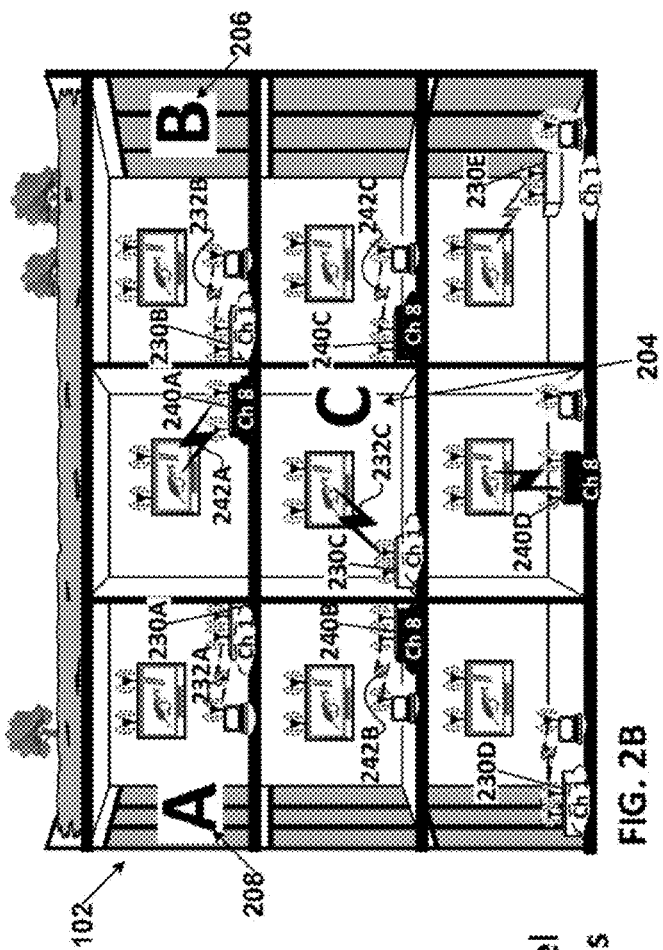
FIGS. 2A-C are respectively elevation views, and a timing diagram for an embodiment of the invention which exploits opportunistic concurrency to increase throughput for each of the WLANs.

FIGS. 1A-D are respectively prior art elevation views, a channel bandplan, and a timing diagram for a representative prior art wireless local area networks (WLANs).

FIG. 1A is an elevation view of a prior art enterprise WLANs deployed in a school or business auditorium 100. WLAN service is provided to the thousands of people in the audience and their associated wireless devices via WAPs 110A-C on Channel 1, and WAPs 120A-C on Channel 8. The WAPs are positioned across the ceiling of the auditorium. Each WAP services its own associated set of stations. All WAPs share a common Service Set Identifier (SSID).

FIG. 1B is an elevation view of a prior art WLANs deployed in a Multi Tenant Dwelling Unit (MTDU) 102, e.g. a condominium or apartment. A total of nine discrete WLANs, one for each condominium are shown. WAPs 130A-E service five of the condominiums on Channel 1. WAPs 140A-D service four of the condominiums on Channel 8. At the particular time at which communications in the condominiums are shown, i.e. $t_0$, the dominant link from WAP 130C has temporarily blocked communications on neighboring WLANs sharing communication Channel 1, i.e. the WLANs supported by WAPs 130A-B and 130D-E. Similarly, the dominant links from WAP 140A and 140D have temporarily blocked communications on neighboring WLANs sharing the communication Channel 8, i.e. the WLANs supported by WAPs 140B-C.

FIG. 1C shows the network bandplan associated with a portion of the IEEE 802.11ac protocol. A number of 20 Mhz channels 150, 152, 154, 156, 158, 160, 162, 164 are shown. Each channel includes multiple sub-carriers, a.k.a. tones, a.k.a. sub-channels, e.g. tones 150A-B for channel 150. These channels may be allocated individually to each WAP but doing so would reduce practicable throughput for video conference and other low, latency and high throughput wireless devices to unacceptably low levels. Alternately, channels can be aggregated with a single 160 MHz channel being allocated to each WAP, with the problem of unacceptably high levels of collision between downlinks of adjacent WAPs sharing the 160 Mhz aggregate communication channel.

FIG. 1D is a timing diagram, showing channel availability blocking on neighboring networks which share Channel 1, over three discrete time intervals: $t_0$-$t_1$, $t_1$-$t_2$, $t_2$-$t_3$. In the interval $t_0$-$t_1$, WAP 130C associated with WLAN "C", reference 104 has seized Channel 1 for transmission of a packet 170 associated with its dominant downlink, i.e. the downlink from WAP 130C to a TV shown in FIG. 1B. Because of the proximity of neighboring WLANs "A" and "B", references 108 and 106 respectively, which share the same communication Channel 1, their prospective communications 174 and 172 are temporarily blocked. In the next interval $t_1$-$t_2$, WAP 130B associated with WLAN "B", reference 106 has seized Channel 1 for transmission of a packet 182 associated with its dominant downlink. Because of the proximity of neighboring WLANs "A" and "C", references 108 and 104 respectively, which share the same communication Channel 1, their prospective communications 184 and 180 are temporarily blocked. Finally, in the next interval $t_2$-$t_3$, WAP 130A associated with WLAN "A", reference 108 has seized Channel 1 for transmission of a packet 194 associated with its dominant downlink. Because of the proximity of neighboring WLANs "B" and "C", references 106 and 104 respectively, which share the same communication Channel 1, their prospective communications 192 and 190 are temporarily blocked. Prior Art neighboring networks in these dense environments, therefore exhibit considerable channel blocking with concomitant loss in throughput.

Figure 2A:
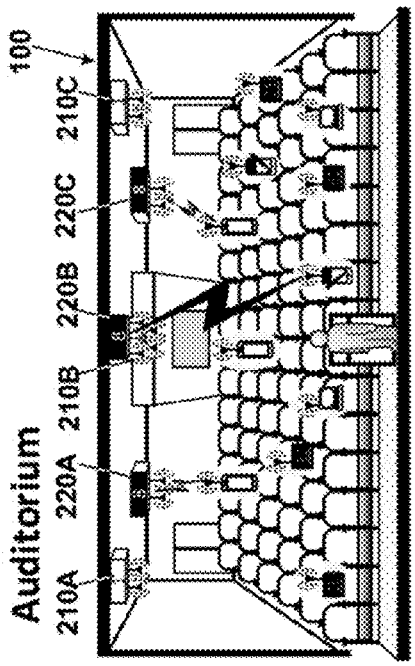
Figure 2C:
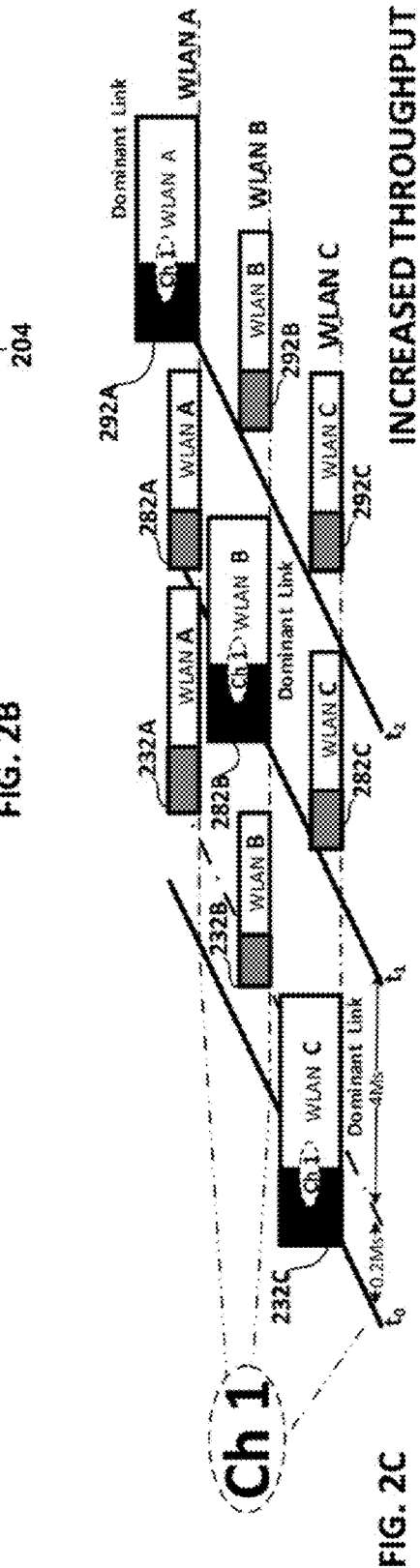

FIGS. 2A-C are respectively elevation views, and a timing diagram for an embodiment of the invention which exploits opportunistic concurrency to increase throughput for each of the WLANs.

FIG. 2A is an elevation view of WAPs supporting opportunistic concurrency in accordance with an embodiment invention, as deployed in the school or business auditorium 100. Improved WLAN service, with reduced channel access blocking is provided to the thousands of people in the audience and their associated wireless devices via WAPs 210A-C on Channel 1, and WAPs 220A-C on Channel 8. The WAPs are positioned across the ceiling of the auditorium. Each WAP services its own associated set of stations. All WAPs share a common Service Set Identifier (SSID).

FIG. 2B is an elevation view of WAPs supporting opportunistic concurrency in accordance with an embodiment invention, as deployed in the Multi Tenant Dwelling Unit (MTDU) 102. The nine discrete WLANs, one for each condominium are shown. WAPs 230A-E service five of the condominiums on Channel 1. WAPs 240A-D service four of the condominiums on Channel 8. At the particular time at which communications in the condominiums are shown, i.e. $t_0$, the dominant link from WAP 130C has not blocked communications on neighboring WLANs sharing communication Channel 1, i.e. the WLANs supported by WAPs 230A-B and 230D-E. Similarly, the dominant links from WAP 240A and 240D has not blocked communications on neighboring WLANs sharing the communication Channel 8, i.e. the WLANs supported by WAPs 240B-C. Thus overall communications on each WLAN are increased.

FIG. 2C is a timing diagram, showing channel availability improvements resulting from the current invention on neighboring networks which share Channel 1, over three discrete time intervals: $t_0$-$t_1$, $t_1$-$t_2$, $t_2$-$t_3$. In the interval $t_0$-$t_1$, WAP 230C associated with WLAN "C", reference 204 has seized Channel 1 for transmission of a packet 232C associated with its dominant downlink, i.e. the downlink from WAP 230C to a TV shown in FIG. 2B. Because of the proximity of neighboring WLANs "A" and "B", references 208 and 206 respectively, which share the same communication. Channel 1, these neighboring WLANs sense the energy on the carrier, i.e. Channel 1, from link 232C, but rather than cease communications temporarily, they instead exploit any opportunities for concurrency that may present themselves during the remainder of this interval. As a result, WAP 230B sends a concurrent link 232B to one of its associated stations, chosen for its proximity and directionality so as to allow meaningful concurrent communications at a reduced power level so as not to interfere with the dominant link 232C. As a result of further optimistic concurrency determinations, WAP 230A may also be able to send a concurrent link 232A to one of its associated stations, also chosen for its proximity and directionality so as to allow meaningful concurrent communications at a reduced power level so as not to interfere with the dominant link 232C or any preceding concurrent link, i.e. link 232B.

In the next interval $t_1$-$t_2$, WAP 230B associated with WLAN "B", reference 206 has seized Channel 1 for transmission of a packet 282B associated with its dominant downlink. Because of the proximity of neighboring WLANs "A" and "C", references 208 and 204 respectively, which share the same communication Channel 1, these WLANs sense the energy on the carrier, i.e. Channel 1, from link 282B, but rather than cease communications temporarily, they instead exploit any opportunities for concurrency that may present themselves during the remainder of this interval. As a result, WAP 230A sends a concurrent link 282A to one of its associated stations, chosen for its proximity and directionality so as to allow meaningful concurrent communications at a reduced power level so as not to interfere with the dominant link 282B. As a result of further optimistic concurrency determinations, WAP 230C may also be able to send a concurrent link 282C to one of its associated stations, also chosen for its proximity and directionality so as to allow meaningful concurrent communications at a reduced power level so as not to interfere with the dominant link 282B or any preceding concurrent link, i.e. link 282A.

In the next interval $t_2$-$t_3$, WAP 230A associated, with WLAN "A", reference 208 has seized. Channel 1 for transmission of a packet 292A associated with its dominant downlink. Because of the proximity of neighboring WLANs "B" and "C"; references 206 and 204 respectively, which share the same communication Channel 1, these WLANs sense the energy on the carrier, i.e. Channel 1, from link 292A, but rather than cease communications temporarily, they instead exploit any opportunities for concurrency that may present themselves during the remainder of this interval. As a result, WAP 230B sends a concurrent link 292B to one of its associated stations, chosen for its proximity and directionality so as to allow meaningful concurrent communications at a reduced power level so as not to interfere with the dominant link 292A. As a result of further optimistic concurrency determinations, WAP 230C may also be able to send a concurrent link 292C to one of its associated stations, also chosen for its proximity and directionality so as to allow meaningful concurrent communications at a reduced power level so as not to interfere with the dominant link 292B or any preceding concurrent link, i.e. link 292B. Thus by exploiting opportunities for concurrent links between neighboring WLANs sharing the same channel, overall throughput of each WLAN is increased.

FIGS. 3A-C are respectively a plan view, a data table view, and a transmission workflow for a wireless transceiver operative in accordance with an embodiment of the invention for concurrent link transmission.

FIG. 3A is a plan view of a condominium 300 showing two of the condominium units 302A, 302B therein. Each condominium has its own WAP and stations. Unit 302A has a discrete WLAN with its own unique SSID, operating on Channel 8, provided by WAP 310, and stations 312A-D. Unit 302B has a discrete WLAN with its own SSID, operating on Channel 8, provided by WAP 320, and stations 322A-D. The proximity and orientation of each WAP and station are shown.

FIG. 3B is a data table view showing the capabilities table 330 and the various capabilities associated with opportunistic concurrency and the WAP or station which possess such capabilities. WAP 320 in condo 302 B is the only transceiver shown with any opportunistic concurrency capabilities. In this embodiment of the invention it is shown to have only the basic capability associated with opportunistic concurrency which is the ability to send a concurrent link, as represented by the corresponding checkmark.

FIG. 3C shows the transmission workflow on WAP 320 associated with the basic capabilities assigned thereto in this embodiment of the invention. When a packet 360A is ready for transmission control is passed to decision process 370 in which a Clear Channel Assessment (CCA) is made. If detected energy is at or below the CCA threshold, e.g. −82 dBm then the channel, i.e. Channel 8, is clear or 'free'. Control is passed via transmission processes 370A for the transmission of the local link packet 360B. That packet, both header and payload, is sent at the maximum allowed power level, e.g. 1 watt, allowed by the IEEE 802.11 standard. That transmission of that packet is identified as the 'Dominant' link since at the time it was sent the Channel was available or free.

Conversely, if the detected energy is above the CCA threshold, e.g. −82 dBm then the channel, i.e. Channel 8, is not clear or 'free'. Control is then passed to decision process 372 to determine the source of the energy/signal detected in the CCA assessment. If the source is a local link, e.g. an uplink from an associated station to the WAP, then control returns to the CCA decision 370 following receipt of the uplink packet. Conversely if the source of the energy/signal detected in the CCA assessment is from the transmission of a packet by a dominant link on a neighboring network sharing the same communication channel then control is passed via opportunistic concurrency pathway 372A to process 376. In process 376 the dominant interfering link is identified. In this case identification is limited to the Received Signal Strength Indication (RSSI) of the remote link. The identification of the dominant interfering remote link in this embodiment of the invention is limited to the RSSI of the remote link and does not include identification of any further specifics about the remote link, i.e. not the transmitter, not the receiver, and not the WLAN on which the remote link is taking place. In the example shown, the "?" question mark indicates we do not know which link "A", "B", "C", or "D" on the WLAN in neighboring condo unit 302A has seized the carrier, but we do know its signal strength, e.g. −70 dBm. Based on this determination and the assumption that at 1 watt transmit power the interference from a concurrent transmission on WAP 320 will also be −70 dBm at WAP 310, a determination as to the required power backoff 360C to reduce the interference to WAP 310 resulting from the prospective concurrent transmission of the packet. In this case the power needs to be reduced to a level at which the prospective interference will be below the CCA threshold, e.g. −82 dBm. A power reduction which produces a 12 dBm drop is called for. After appropriate power backoff to a fraction of a watt, the concurrent packet 360D is sent.

FIGS. 4A-C are respectively the plan view, the data table view, and the transmission workflow shown in FIGS. 3A-C including additional workflow associated with node proximity detection in accordance with an embodiment of the invention;

FIG. 4A shows the plan view of the condominium shown in FIG. 3A. FIG. 4B shows the capabilities table 330 with the WAP including the added opportunistic concurrency capability of node proximity detection.

FIG. 4C shows the transmission workflow on WAP 320 associated with the basic capabilities discussed above in connection with FIG. 3C and in addition the ability to determine node proximity at least as to the associated stations, 322a-d, as shown in table 440. Table 440 is accumulated by the WAP 320 by measuring the uplink RSSI during received communications from each of its associated stations. This information as to local node proximity is used to decide in decision process 482 whether or not to send the next packet 360A as a concurrent link. If packet 360A is destined for proximate stations 322a/b then transmission of the concurrent local link 360D will take place after appropriate power backoff. These stations 322a/b have a significantly higher RSSI −40 dBm at the WAP 320 than does the dominant remote link −70 dBm, and thus are more likely to tolerate a power backoff associated with a concurrent link, with less effect on throughput than will the more distant stations 322c/d which have much lower RSSI already, e.g. −60 dBm. Therefore, if packet 360A is destined for either of the distant stations 322c/d the transmission of the link will be aborted or delayed and control will be returned to CCA determination 370.

FIGS. 5A-C are respectively the plan view, the data table view, and the transmission workflow shown in FIGS. 3A-C including additional workflow associated with node direction detection in accordance with an embodiment of the invention;

FIG. 5A shows the plan view of the condominium shown in FIG. 3A. FIG. 5B shows the capabilities table 330 with the WAP including the added opportunistic concurrency capability of node direction detection.

FIG. 5C shows the transmission workflow on WAP 320 associated with the basic capabilities discussed above in connection with FIG. 3C and in addition the ability to determine node direction at least as to the associated stations, 322a-d, as shown in table 540. Table 540 is accumulated by the WAP 320 by measuring the directions of uplink during received communications from each of its associated stations. Node direction in different embodiments of the invention is based on: RSSI differences on MIMO antennas resulting from transmissions of associated stations, or MIMO beamforming matrices optimum power vector orientation, or differences in time of arrival of preambles at the MIMO antenna of the WAP, or differences in RSSI at various ones of the MIMO antenna which exhibit significant directionality, or by triangulation of different RSSI experienced for a given transmission from different associated stations, as aggregated by the WAP 320. This information as to local node direction relative to the WAP 320 is used to decide in decision process 582 whether or not to send the next packet 360A as a concurrent link. If packet 360A is destined for stations that are at a substantially different compass heading, than that of the dominant remote link which comes from the 'South' then the corresponding link(s) are said to be antipodal to that of the interfering dominant link. If the MIMO antenna are capable of significant beamforming directionality, a.k.a. anisotrophy, this technique alone may be used to determine whether or not to send a concurrent link packet. Stations 322a/c lie 'East' of the WAP 320 and thus are sufficiently antipodal as to allow transmission of the concurrent link 360D after appropriate power backoff. These stations 322a/b are directionally isolated from the dominant remote link, positioned 'East' of WAP 320 as opposed to the dominant link from WAP 310 which lies 'South' of the WAP 320. Thus the links 'a' or 'c' to stations 322a and 322c respectively are more likely to tolerate a power backoff associated with a concurrent link, with less effect on throughput than will the stations 322c/d which are positioned generally in the same direction as that of the interfering dominant link. Therefore, if packet 360A is destined for either of the stations 322c/d positioned to the 'South' the transmission of the link will be aborted or delayed and control will be returned to CCA determination 370.

FIGS. 6A-C are respectively the plan view, the data table view, and the transmission workflow shown in FIGS. 3A-C including additional workflow associated with node direction and proximity detection and concurrent link selection in accordance with an embodiment of the invention.

FIG. 6A shows the plan view of the condominium shown in FIG. 3A. FIG. 6B shows the capabilities table 330 with the WAP including the added opportunistic concurrency capability of parallel packet assembly in addition to node proximity and direction detection.

FIG. 6C shows the transmission workflow on WAP 320 associated with the basic capabilities discussed above in connection with FIG. 3C as well as the added capabilities discussed in FIG. 4C and FIG. 5C. In addition, the WAP 320 in this embodiment of the invention has the ability to prepare packets for more than one link, e.g. packets 660A-D associated with links 'a', 'b', 'c', 'd', respectively within condo unit 302B and to select which to send concurrently in the event of a remote dominant link which has seized the shared communication channel. Table 650 shows both RSSI and direction of the associated stations relative to WAP 320. This information as to local node location, e.g. signal strength and direction relative to the WAP 320 is used to decide in process 682 which packet to send as a concurrent link.

The identification of the dominant interfering remote link in this embodiment of the invention includes in addition to the RSSI of the transmitter of the remote link, the directionality of that transmitter link relative to the WAP 320. In process 376 the WAP determines both the RSSI and the directionality of the remote link, in this case the direction of the transmitter of the remote link, e.g. neighboring WAP 310. In the example shown, the RSSI of the dominant link is −70 dBm and the interference from that link is being received by WAP 420 from the 'South'. Based on this information the concurrent link selector 682 selects a packet associated with a link that is proximate to WAP 320 and antipodal to the direction of the interfering link. In the example shown packet 660A associated with link 'a' from WAP 320 to station 322a is selected for concurrent transmission in a time interval which overlaps with the dominant link yet does not interfere with same. Thus, after power back off on both the header and payload the packet 660A is sent as a concurrent link. Opportunistic concurrency is not limited to selection of concurrent links. As shown in FIG. 6C the dominant transmission path availability intervals are more likely to be spent servicing the least likely concurrent links as a result of existing buffer management processes. Thus the least likely concurrent link due to its distance and direction, i.e. link 'd' between WAP 320 and station 322d is more likely to be sent in a dominant link interval when the WAP 320 has seized the communication channel.

Figure 7B:
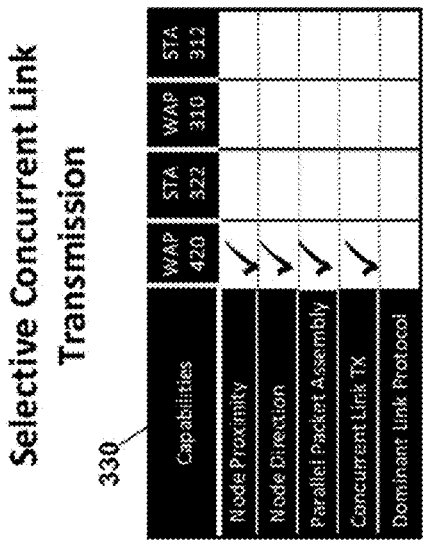
FIGS. 7A-C are respectively the plan view, the data table view, and the transmission workflow shown in FIGS. 6A-C including additional workflow associated with conditional concurrent link selection in accordance with an embodiment of the invention.
Figure 7A:
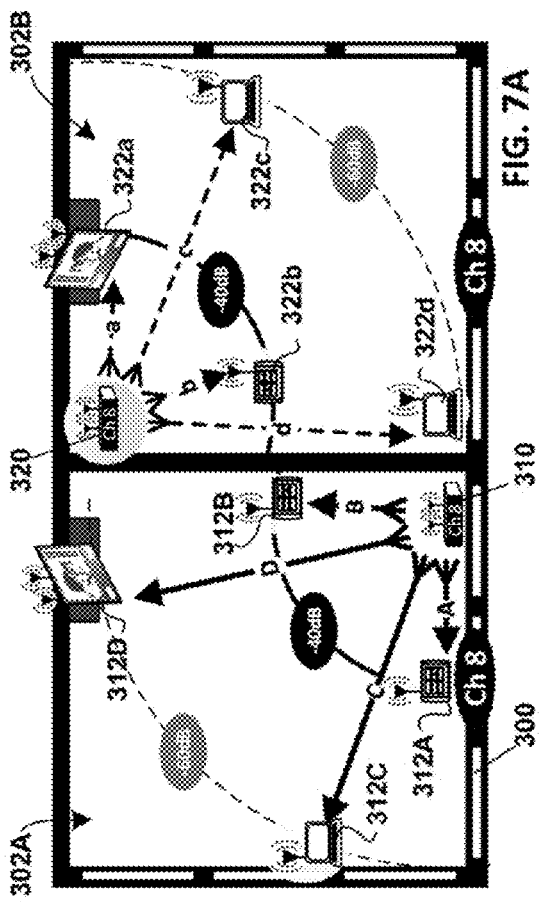
Figure 7C:
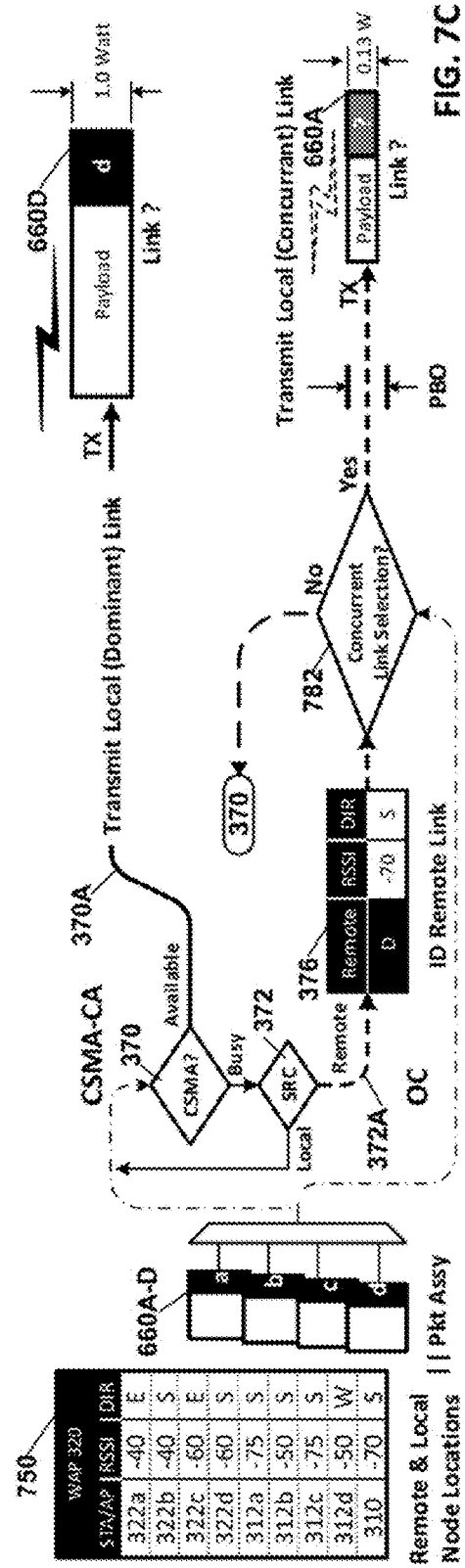

FIGS. 7A-C are respectively the plan view, the data table view, and the transmission workflow shown in FIGS. 6A-C including additional workflow associated with conditional concurrent link selection in accordance with an embodiment of the invention.

FIG. 7A shows the plan view of the condominium shown in FIG. 3A. FIG. 7B shows the capabilities table 330 with the WAP including in addition to all the above discussed capabilities, the added opportunistic concurrency capability of proximity and direction as to both local nodes, e.g. stations 322a-322d, as well as to remote transceiver nodes on neighboring WLAN(s), e.g. stations 312a-d, and WAP 310.

FIG. 7C shows the transmission workflow on WAP 320 associated with the basic capabilities discussed above in connection with FIG. 3C as well as the added capabilities discussed in FIG. 4C, FIG. 5C and FIG. 6C. In addition, the WAP 320 in this embodiment of the invention the WAP 320 has the added opportunistic concurrency capability of determining location, e.g. proximity and direction of both local station nodes and remote nodes, e.g. WAP and stations of neighboring networks which share the same communication channel. Node location table 750 shows both RSSI and direction of the associated stations and remote station(s)/WAP(s) relative to WAP 320. This information is used by the WAP 320 to decide in decision process 782 which packet exhibits the best isolation from the interferer as to proximity and direction, and whether the best is good enough, i.e. whether the best link will have low enough interference with the dominant link, e.g. below the CCA threshold at both the transmitting and receiving node of the dominant link. If it does not, then the transmission of a concurrent link will be delayed or aborted and control will return to the CCA determination process 370.

In process 376 the identification of the dominant interfering remote link takes place. WAP 320 determines both the RSSI and the directionality of the remote link, in this case the direction of the transmitter of the remote link, e.g. neighboring WAP 310 and the direction and proximity of the receiver, e.g. station 312d of the remote dominant link. This latter information is ascertained in an embodiment of the invention by the WAP from prior monitoring of ACKs from the receiver of the dominant link, e.g. station 312D. After identification of the location of the transmitter and receiver of the dominant link the WA 320 selects link 'a' and associated packet 660A for transmission. However, before transmission the WAP 320 also evaluates the interference to both transmitter and receiver of the dominant link, and if the interference can not be reduced at both transceiver nodes to below the CCA threshold of −82 dBm then the transmission of the concurrent link is delayed or aborted and control returns to decision process 370. In the example shown, where the dominant link is link 'D' between WAP 310 and station 312D the WAP 310 will delay or abort the sending of any concurrent link. In the example shown, where the dominant link is link 'D' between WAP 310 and station 312D the WAP 310 will delay or abort the sending of any concurrent link. Conversely, where the dominant link is 'C' between WAP 310 and station 312C the WAP 310 may send a concurrent link, e.g. link 660A, after power back off on both the header and payload.

FIGS. 8A-C are respectively the plan view, the data table view, and the transmission workflow shown in FIGS. 7A-C including additional workflow associated with transmission of a dominant link according to a set of protocols which enhance opportunistic concurrency for neighboring networks, in accordance with an embodiment of the invention.

FIG. 8A shows the plan view of the condominium shown in FIG. 3A. FIG. 8B shows the capabilities table 330 with the WAP including in addition to all the above discussed capabilities, the added opportunistic concurrency capability of transmission of a dominant link according to a set of protocols which enhance opportunistic concurrency for neighboring networks.

FIG. 8C shows the transmission workflow on WAP 320 associated with the basic capabilities discussed above in connection with FIG. 3C as well as the added capabilities discussed in FIG. 4C, FIG. 5C, FIG. 6C and FIG. 7C. In addition, the WAP 320 in this embodiment of the invention the WAP 320 has the ability to reduce the power 880 of the payload portion of the packet 660B when it is transmitting the packet as a dominant link and to maximize the power on the header of the packet to maintain CSMA protocols on the WLAN. This 'courtesy' to neighboring networks reduces the interference from the payload portion of the dominant packet to those neighboring WLANs with opportunistic concurrency capabilities.

In an other embodiment of the invention opportunistic concurrency capabilities of the WAP 320 may also include the sequencing of dominant downlinks in a non-random or predictable sequence of link transmissions which may also increase concurrent link opportunities for neighboring networks sharing the same channel, by adding predictability as to the availability of concurrent link intervals.

In still an other embodiment of the invention opportunistic concurrency capabilities of the WAP 320 may also include establishing non-random, e.g. predictable packet lengths associated with each dominant link packet transmission which may also increase concurrent link opportunities for neighboring networks sharing the same channel, by adding predictability as to the duration of concurrent link intervals.

Figure 9A:
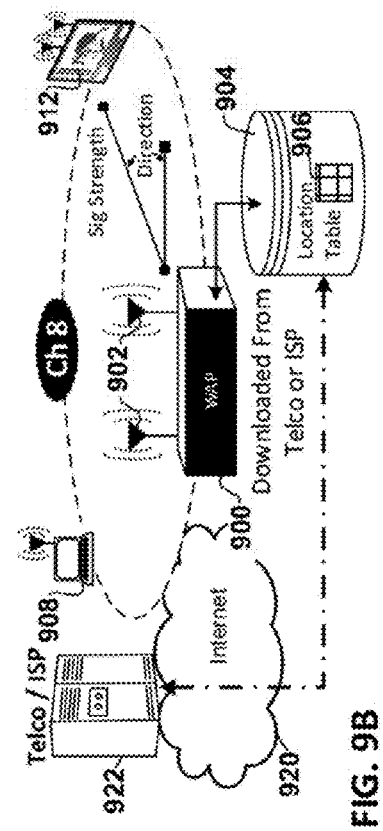
FIGS. 9A-D are system views of alternate embodiments of the invention for determining location of local and remote WLAN nodes.

FIGS. 9A-D are system views of alternate embodiments of the invention for determining location of local and remote WLAN nodes on adjacent WLAN(s). In FIG. 9A the WAP 900 uses its MIMO antennas 902 to determine the signal strength and direction of each of its associated stations, 908 and 912 and stores the resultant information, i.e. the node location table 906 in storage 904. In another embodiment of the invention the WAP 900 uses the same capabilities to determine the signal strength and direction of remote WAP or station nodes sharing the same communication channel.

Figure 9B:
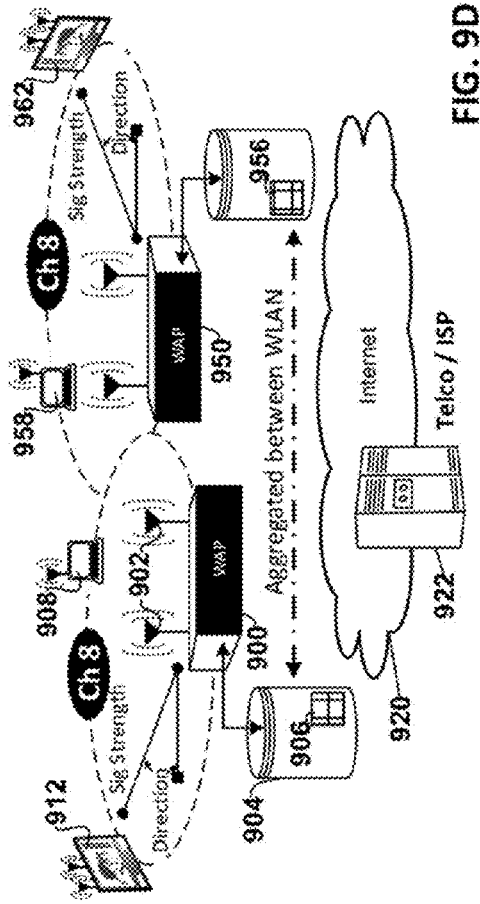

In FIG. 9B the WAP 900 uses information provided by the Telco or ISP 922 over the Internet 920 as to the signal strength and direction of each of its associated stations, 908 and 912 and stores the resultant information, i.e. the node location table 906 in storage 904. That information may be determined by the Telco or ISP installer on premises and later downloaded by the Telco or ISP to the WAP 900. Alternately, the information may be calculated by the Telco or ISP based on information such as beamforming matrices and RSSI as provided by the WAP 920, which may be extrapolated in the 'cloud' server 922 and downloaded by the Telco or ISP over the Internet to the WAP 900. In another embodiment of the invention the WAP 900 receives additional location information from the Telco or ISP as to the location of neighboring WLAN nodes sharing the same communication channel.

Figure 9C:
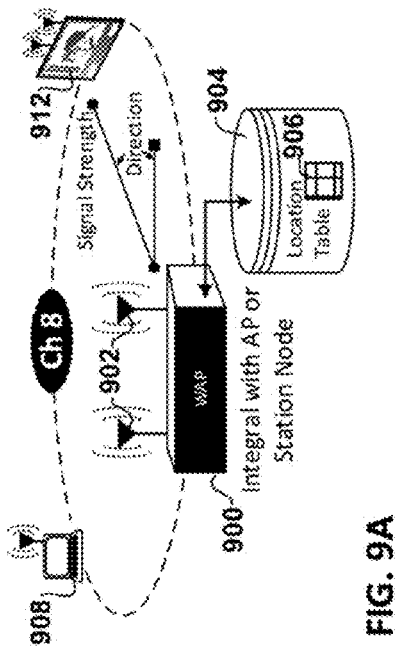

In FIG. 9C the WAP 900 uses its MIMO antennas 902 to determine the signal strength and direction of each of its associated stations, 908 and 912 and stores the resultant information in the node location table 906 in storage 904. Additionally, the WAP 320 accumulates independently derived information as to signal strength and direction uploaded from each of its associated stations and stores all such location information in the node location table 906 as well. For example, stations 908 and 912 uploads their respective location tables 910 and 914 to WAP 900. Node location table 910 identifies the direction and signal strength of station 912 and WAP 900. Location table 914 identifies the direction and signal strength of station 908 and WAP 900. This independently derived information is uploaded to the WAP 900 where it may be used for triangulation of each station and the WAP relative to each other. In another embodiment of the invention the WAP 900 and its stations use the same capabilities to determine the signal strength and direction of remote WAP or station nodes sharing the same communication channel.

Figure 9D:
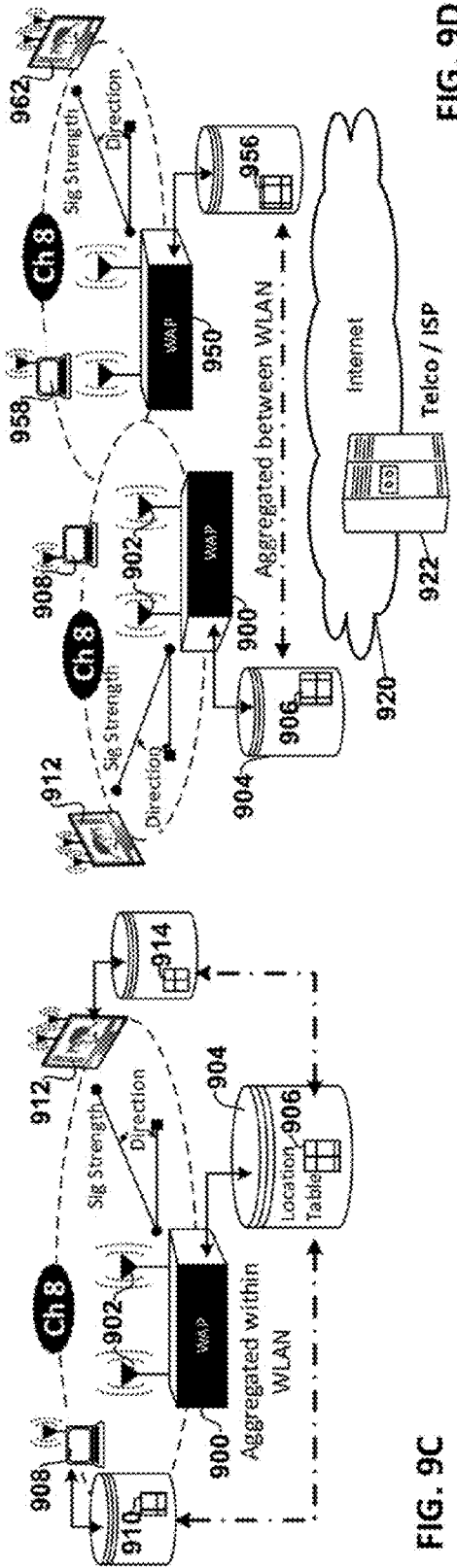

In FIG. 9D the WAP 900 uses its MIMO antennas 902 to determine the signal strength and direction of each of its associated stations, 908 and 912 and stores the resultant information in its node location table 906 in storage 904. Additionally, the neighboring WAP 950 sharing the same communication channel uses its MIMO antennas to determine the signal strength and direction of each of its associated stations, 958 and 962 and stores the resultant information in its node location table 956. The WAPs 900 and 950 then exchange the independently derived location information between themselves, either directly or via a common connection to Telco/ISP 922 via the Internet.

Figures 10A, 10B, 10C:
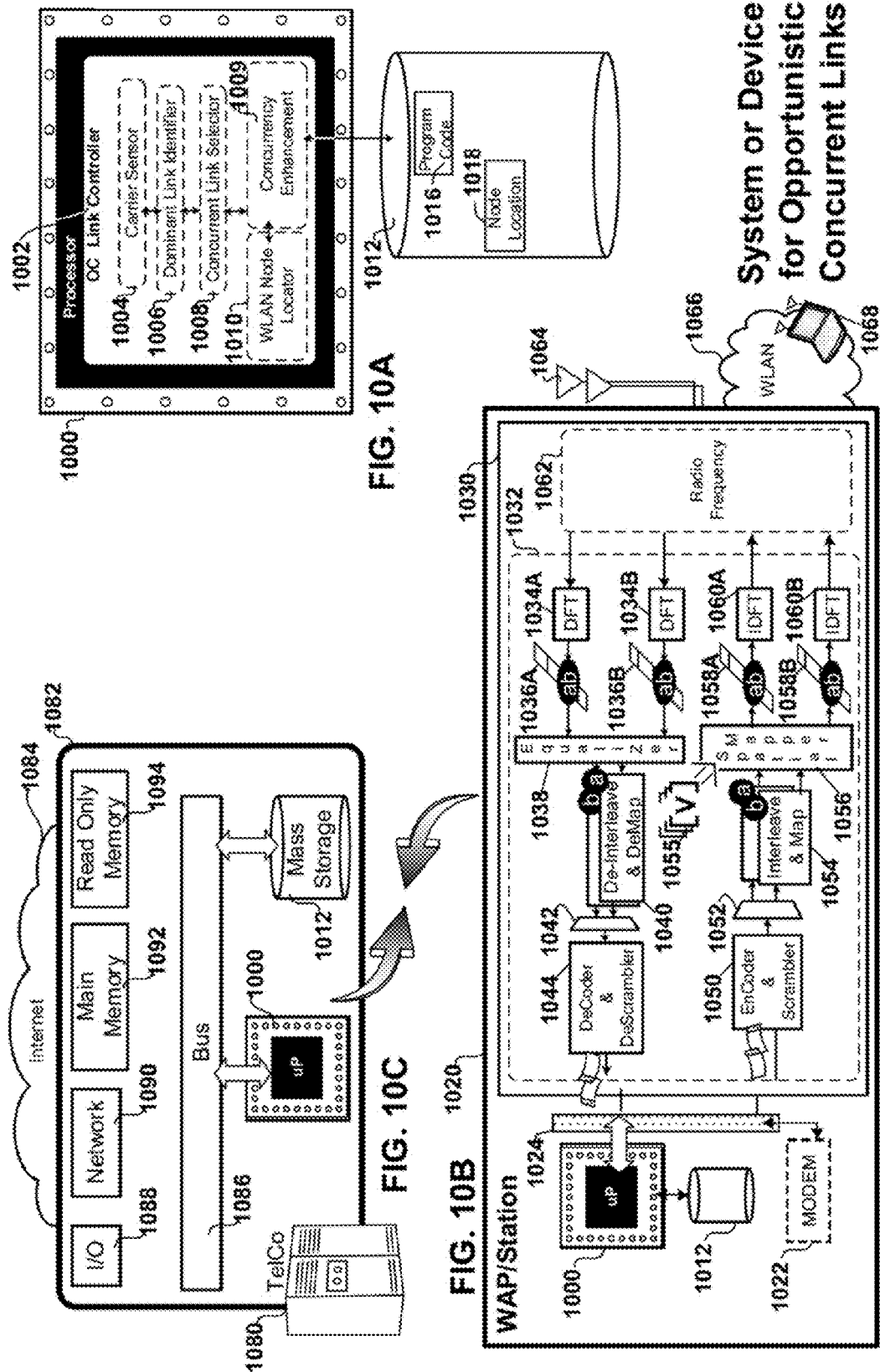
FIGS. 10A-C are hardware block diagrams of various devices configured to execute opportunistic concurrency between WLANs in accordance with various embodiments of the current invention.

FIGS. 10A-C are hardware block diagrams of various devices configured to execute opportunistic concurrency between neighboring WLANs sharing the same communication channel in accordance with various embodiments of the current invention.

FIG. 10A shows a processor 1000 and memory element or storage module 1012 configured to execute opportunistic concurrency program code 1016 associated with an Opportunistic Concurrency "OC" link controller module 1002. The program code may be configured to run on a single device such as a WAP or station or cooperatively on one or more host devices. The OC link controller module includes: a carrier sensor module, 1004, a dominant link identifier module 1006, a concurrent link selector module 1008, a WLAN node locator module 1010, and an opportunistic concurrency enhancement module 1009. In addition to program code, the storage module includes: a node location table 1018.

In operation the carrier sensor module 1004 a carrier sensor module is configured to sense availability and unavailability of the selected communication channel based on a relationship between a sensed signal level on the selected communication channel and a clear channel assessment (CCA) threshold level, e.g. −82 dBm.

The dominant link identifier module 1006 is responsive to a determination of carrier unavailability by the carrier sensor module and configured to identify carrier unavailability arising from a remote link on a neighboring WLAN. In an embodiment of the invention identification of the dominant link may may be limited to basics: e.g. the signal strength of that link without further information as to the transmitter or receiver of the remote link or the WLAN of which it is a part. In another embodiment of the invention identification of the dominant link may extend to the advanced: e.g. the signal strength and direction of the transmitter associated with the remote link, and the receiver of the remote link, and may also include information as to the neighboring WLAN of which the remote link is a part.

The concurrent link selector module 1008 is responsive to the identification of carrier unavailability arising from the remote link by the dominant link identifier and configured to transmit a concurrent communication link to a corresponding one of the transceiver nodes on the associated WLAN, and the concurrent communication link transmission configured to avoid interference above the CCA threshold level with the remote link, thereby increasing throughput on the associated WLAN.

The WLAN node locator module 1010 is configured to take the directional and signal strength information as to both local and remote nodes, whether WAP or station and to extrapolate from that information at least a relative location of each station and WAP on the local WLAN. In another embodiment of the invention where the information collected includes directional and signal strength information on remote links on neighboring WLAN(s) the WLAN node locator extrapolates the relative location of each station and WAP on the neighboring WLAN(s) which share the same communication channel as well. In another embodiment of the invention where aggregation of location information takes place between a WAP and its stations, or between WLANs the WLAN node locator module performs similar extrapolations on the expanded data set. The WLAN node locator module may be present on the each individual WAP and station node, or exclusively on a WAP node, or exclusively in the 'Cloud' provided by the Telco or ISP. In this latter case it works with the proximity and directionality information provided by the individual WAP(s) and station(s) and extrapolates the required location information therefrom for redistribution to the WAP(s) and station(s).

The Opportunistic Concurrency enhancement module 1009 is responsive to a determination of carrier availability by the carrier sensor module and configured to set discrete power levels for a header and a payload portion of a packet of a dominant communication link on the associated WLAN, with the power level of the payload portion of the packet substantially lower than that of the header, thereby increasing opportunities for concurrent communications on remote WLANs during transmission of the dominant communication link on the subject WLAN.

In an other embodiment of the invention the opportunistic concurrency module 1009 may also control the sequencing of dominant downlinks in a non-random or predictable sequence of link transmissions which may also increase concurrent link opportunities for neighboring networks sharing the same channel, by adding predictability as to the availability of concurrent link intervals.

In still an other embodiment of the invention the opportunistic concurrency module 1009 may also control the packet assembly of non-random, e.g. predictable packet lengths associated with each dominant link packet transmission which may also increase concurrent link opportunities for neighboring networks sharing the same channel, by adding predictability as to the duration of concurrent link intervals.

FIG. 10B shows a wireless access point (WAP) 1020 configured as a host device servicing a WLAN 1066 which includes wireless station 1068. The WAP supports discrete communications with a station 1068 or concurrent multiple user multiple-input multiple-output (MU-MIMO) communications with multiple stations. The WAP 1020 in this embodiment of the invention is identified as a 2×2 WAP supporting as many as 2 discrete communication streams "a", "b" over two antennas 1064. The WAP 1020 includes: the processor 1000 and storage 1012; a bus 1024, a WLAN stage 1030 including a base band stage 1032, a radio frequency (RF) stage 1062 and MIMO antennas 1064. The WAP RF stage supports one or more IEEE 802.11 wireless local area network (WLAN) protocols. The WAP also includes a modem 1022 for coupling via copper or fiber to an Internet Service Provider (ISP) 1080. The processor in addition to supporting the IEEE 802.11 WAP functionality also executes the program code which provides Occupational Concurrency functionality as discussed above.

In the baseband stage 1032 transmitted communications for user/station 1068 are encoded and scrambled in encoder scrambler module 1050 and de-multiplexed into two streams in demultiplexer 1052. Each stream "a", "b" is subject to interleaving and constellation mapping in an associated interleaver mapper 1054 and passed to the spatial mapper 1056. The spatial mapper uses a beamsteering matrix 1055 determined from a prior isotropic sounding of the link with station 1068 to steer subsequent communications thereto. The beamsteering matrix specifies specific phase and amplitude adjustments for the communications on each antenna designed to steering the outgoing communications toward the recipient station. There is a discrete beamsteering matrix for each of the OFDM tones or sub-channels. The combined streams "ab" are injected into each of the OFDM tones or sub-channels 1058A-B of the inverse discrete Fourier Transform (IDFT) modules 1060A-B respectively. Each IDFT module is coupled via associated upconversion circuitry in the RF stage 1062 to an associated one of the pair of antenna 1064. During Explicit soundings there is no beamsteering, rather the RF radiation signal strength is the same in all directions.

In the RF Stage 1062 received communications "ab" on each of the two antenna 1064 from user/station 1068 are downconverted and supplied as input to the baseband stage 1032. In the baseband stage the received communications are then transformed from the time to the frequency domain in the discrete Fourier Transform (DFT) modules 1034A-B from which they are output as discrete orthogonal frequency division multiplexed (OFDM) tones/sub-carriers/sub-channels 1036A-B. All received streams are then subject to equalization in equalizer 1038. Received steams "ab" are subject to de-interleaving and constellation demapping in associated deinterleaver demapper modules 1040, followed by multiplexing in multiplexer 1042. The received data "ab" is decoded and descrambled in decoder descrambler 1044.

FIG. 10C shows a Telco or ISP 1080 having a server 1082 configured as a host device and coupled to the Internet 1084. The server includes the processor 1000 and storage 1012; a bus 1086, an input/output (I/O) module 1088 for interfacing with a user, a network module 1090 for coupling to a network, a main memory 1092 for storing and executing program code 1016 and data, a read only memory 1094 for storing bootup program code. The processor in addition to supporting the server functionality also executes the program code which provides OC functionality as discussed above. In an embodiment of the invention the WAP 1020 performs levels of OC determination such as signal strength and direction of each node, and the server 1082 performs the final location determination of each WLAN node relative to the others for subsequent download to the associated WLAN transceiver nodes, i.e. WAP or Station nodes. In another embodiment of the invention all OC functionality resides on the WAP or station or both.

Figure 11:
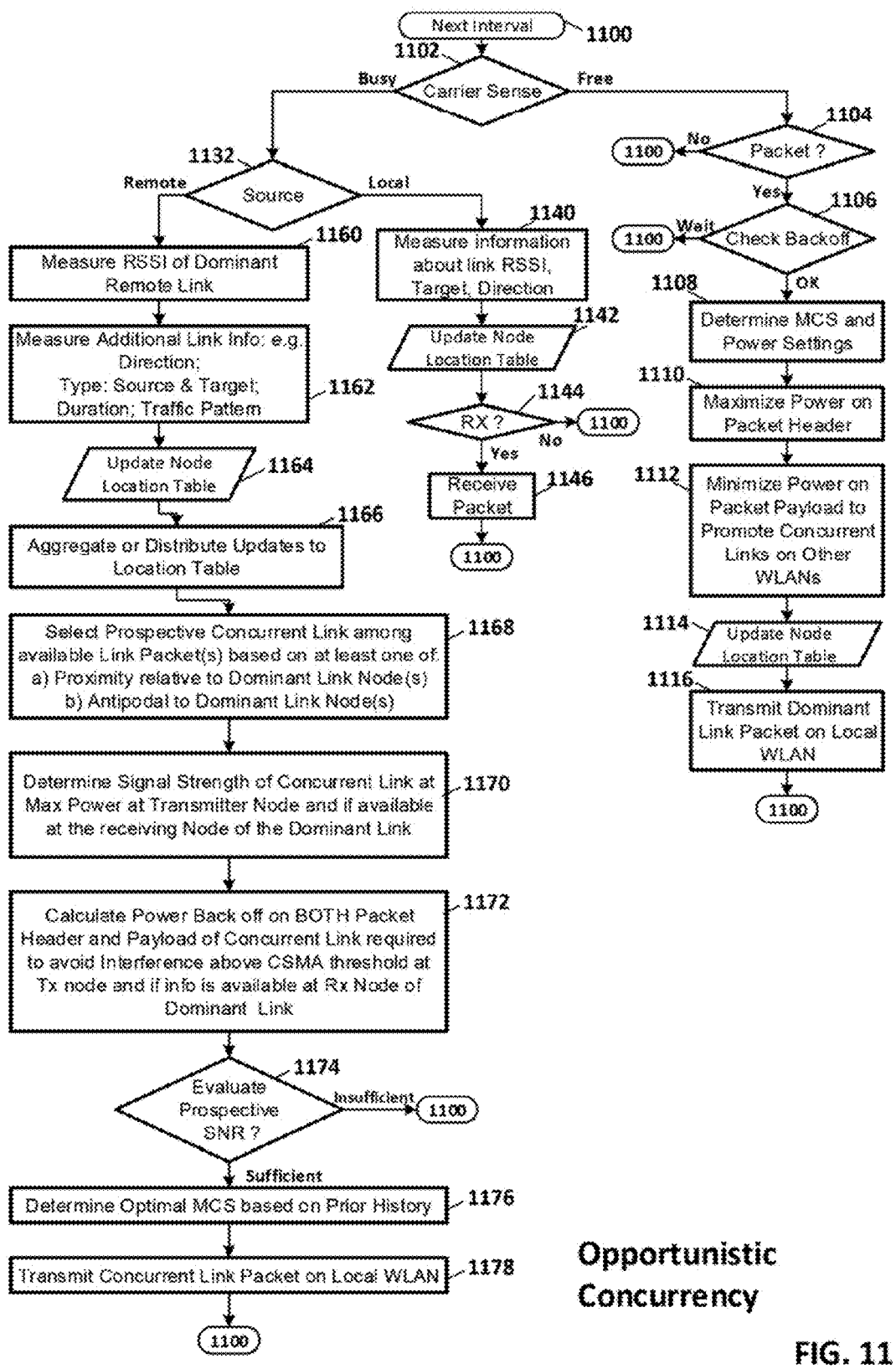
FIG. 11 is a process flow diagram of processes associated with opportunistic concurrency in accordance with various embodiments of the current invention.

FIG. 11 is a process flow diagram of processes associated with opportunistic concurrency in accordance with various embodiments of the current invention. Processing begins with the next carrier sense interval 1100 followed by a CCA determination in decision process 1102. If the carrier, i.e. the selected communication channel, is free then control is passed to decision process 1104. In decision process 1104 a determination is made as to whether there is another packet for transmission by the subject WAP or station on which the OC concurrency is enabled. If not, control returns to process 1100. If a packet is ready control passes to decision process 1106 for a determination as to whether any associated backoff interval associated with the CSMA-CA IEEE 802.11 standard has expired. If it has control is passed to process 108 in which the Modulation and Coding Schema (MCS) and transmit power settings for the dominant link are determined. Control then passes to process 1110 in which the transmit power on the packet header portion of the communication packet is maximized consistent with the CSMA-CA access notification set forth in the IEEE 802.11 standard. Next control passes to optional process 1112 in which the power on the payload portion of the communication packet is minimized thereby enhancing or promoting opportunities for concurrent links on neighboring WLAN(s) sharing the same communication channel, or another channel with significant overlap with the selected communication channel. Next control is passed to process 1116 for the update of the node location table with the power and MCS settings associated with the transmission of the dominant link. Next in process 1116 the dominant link packet is transmitted on the local WLAN.

If alternately in decision process 1102 a determination is made that the selected communication channel or carrier is busy and not available then control is passed to decision process 1132. In decision process 1132 a determination is made as to the source of channel unavailability, e.g. either, a remote link or a local link. If the selected communication channel is busy to a local link, e.g. an uplink from another station to the subject WAP or a downlink from the WAP to a station other than the subject station then control is passed to process 1140. In process 1140 the information as to the local link, e.g. its RSSI, its source and target, and its direction is saved in the following process 1142 in the Node location table. Control is then passed to decision process 1144 in which a determination is made as to whether the unavailability of the carrier is due to an incoming link which the subject transceiver, i.e. WAP or station needs to receive. If so, then control is passed to process 1146 for the reception of the packet associated with the detected local link. Control then returns to process 1100.

If alternately in decision process 1132 a determination is made that the source of the channel/carrier unavailability is due to a remote link then control is passed to process 1160 for the measurement of the RSSI of the temporarily dominant remote link. Next in process 1162 additional link information may be accumulated such as the direction of the link, the type of the link source and target, i.e. WAP or station, and the duration of the link, and any additional information regarding the link traffic such as the packet length and time of transmission. In process 1164 this information is stored in the node location table. Then in process 1166 any aggregation or distribution of the updates to the node location table between transceivers on a WLAN or between WLANs, or between a transceiver and the ISP or Telco are accomplished, Next in process 1168 a prospective concurrent link among any available link packet(s) is made based on at least one of: a) the proximity of the prospective local link's target transceiver, relative to the proximity of the dominant remote link transmitter; or b) the degree of antipodality, e.g. directional displacement, between the dominant link and the prospective concurrent link, as to either or both each links transmitter or transmitter and receiver. Control is then passed to process 1170 in which a determination is made as to the signal strength of the concurrent link at maximum transmit power identified by the IEEE 802.11 standard at the transmitter node of the dominant link, and also further in an embodiment of the invention at the receiving node of the dominant link. Control is then passed to process 1172 in which the power backoff of both the packet header and payload of the prospective concurrent link is calculated so as to avoid interference above the CSMA-CA CCA threshold at the transmitter node and if info is available at the receiving node of the dominant link. Next based on the calculations, the estimated SNR of the prospective concurrent link to determine its sufficiency. If sufficient, control is passed to process 1176 for a determination of the optimal MCS at the reduced power level, based on the prior history collected in the node location table. Next the concurrent link packet is transmitted on the local WLAN in process 1178.

The components and processes disclosed herein may be implemented a software, hardware, firmware, or a combination thereof including program code software, a memory element for storing the program code software and a processor for executing the program code software, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless transceiver apparatus configured to support wireless communications with associated transceiver nodes on a selected wireless communication channel on a wireless local area network (WLAN); and the wireless transceiver apparatus comprising:
   a plurality of components coupled to one another to form transmit and receive paths for processing wireless communications on the selected wireless communication channel;
   an opportunistic link controller coupled to the plurality of components and including:
      a carrier sensor module configured to sense availability and unavailability of the selected wireless communication channel based on a relationship between a sensed signal level on the selected communication channel and a clear channel assessment (CCA) threshold level and responsive to availability of the selected communication channel, to initiate packet transmission at a first power level from the wireless transceiver apparatus to a selected on of the associated transceiver nodes; and
      a dominant link identifier module responsive to a determination of unavailability of the selected communication channel by the carrier sensor module and configured to identify unavailability arising from transmissions on a neighboring WLAN sharing the selected communication channel; and
      a concurrent link selector module responsive to the identification of unavailability of the selected communication channel arising from the transmissions on a neighboring WLAN identified by the dominant link identifier, and configured to select an isolated one of the associated transceiver nodes based on a proximity of the transceiver node to the wireless transceiver apparatus and to calculate a backoff transmit power level substantially less than the first power level for transmissions from the wireless transceiver apparatus to the selected isolated transceiver node, which minimize interference with the transmissions on the neighboring WLAN.

2. The wireless transceiver apparatus of claim 1, wherein the opportunistic link controller further comprises:
   the dominant link identifier module further configured where unavailability arises from the transmissions on the neighboring WLAN, to identify at least a Received Signal Strength Indication (RSSI) of said transmissions from the neighboring WLAN at the wireless transceiver apparatus; and
   the concurrent link selector module further configured to utilize the RSSI identified by the dominant link identifier to estimate a transmit power level of the transmissions on the neighboring WLAN and to limit the backoff transmit power level link to a level substantially less than said estimated transmit power level.

3. The wireless transceiver apparatus of claim 1, wherein the opportunistic link controller further comprises:
   a WLAN node locator module configured to accumulate directional and signal strength information as to the associated transceiver nodes on the WLAN and to extrapolate at least locations of each associated transceiver node relative to the wireless transceiver apparatus therefrom; and
   the concurrent link selector module further configured to utilize the relative locations of the associated transceiver nodes provided by the WLAN node locator module to select as the isolated one of the transceiver nodes the most proximate associated transceiver node.

4. The wireless transceiver apparatus of claim 1, wherein the opportunistic link controller further comprises:
   the concurrent link selector module further configured to determine whether the backoff transmit power level, also provides a sufficient Signal-to-Noise Ratio (SNR) at the selected isolated transceiver node prior to initiating transmissions to the selected isolated transceiver node, whereby concurrent transmissions are initiated only if the SNR is sufficient.

5. The wireless transceiver apparatus of claim 1, wherein the opportunistic link controller further comprises:
   the concurrent link selector module further configured to utilize the backoff transmit power level for both a header and a payload portion of each packet transmitted from the wireless transceiver apparatus to the selected isolated transceiver node.

6. The wireless transceiver apparatus of claim 1, wherein the opportunistic link controller further comprises:
   a WLAN node locator module configured to accumulate directional and signal strength information as to the associated transceiver nodes on the WLAN as well as transceiver nodes on the neighboring WLAN and to extrapolate locations of each node relative to the wireless transceiver apparatus therefrom; and the concurrent link selector module further configured to utilize the relative locations provided by the WLAN node locator module to select the isolated one of the associated transceiver nodes based both on its proximity to the wireless transceiver apparatus and its distance from a transmitting one of the transceiver nodes on the neighboring WLAN.

7. The wireless transceiver apparatus of claim 1, further comprising:

a plurality of antennas;

the plurality of components further coupled to one another to form a plurality of the transmit and receive paths each coupled to a corresponding one of the plurality of antennas for multiple-input multiple-output (MIMO) beamformed communications;

a WLAN node locator module configured to accumulate directional and signal strength information as to the associated transceiver nodes on the WLAN as well as transceiver nodes on the neighboring WLAN and to extrapolate locations of each node relative to the wireless transceiver apparatus therefrom; and the current link selector module further configured to utilize the relative locations provided by the WLAN node locator module to select the isolated one of the associated transceiver nodes based further a degree of antipodality between locations relative to wireless transceiver apparatus of a transceiver node responsible for the transmissions on the neighboring WLAN and the isolated one of the transceiver nodes; whereby MIMO beamformed transmissions from the wireless transceiver apparatus to the selected isolated transceiver node are directed toward the selected isolated one of the transceiver nodes and away from the transceiver node responsible for transmissions on the neighboring WLAN.

8. The wireless transceiver apparatus of claim 1, further comprising:

a plurality of antennas;

the plurality of components further coupled to one another to form a plurality of the transmit and receive paths each coupled to a corresponding one of the plurality of antennas for multiple-input multiple-output (MIMO) beamformed communications;

a WLAN node locator module configured to accumulate directional and signal strength information as to the associated transceiver nodes on the WLAN as well as transceiver nodes on the neighboring WLAN and to extrapolate locations of each node relative to the wireless transceiver apparatus therefrom;

the dominant link identifier module further configured to identify from the transmissions on the neighboring WLAN a direction of said transmissions on the neighboring WLAN from a transmitting one to a receiving one of the transceiver nodes; and the concurrent link selector module further configured to utilize the relative locations provided by the WLAN node locator module and the direction of the transmissions on the neighboring WLAN identified by the dominant link identifier to select the isolated one of the associated transceiver nodes based further on a degree of antipodality between the direction of transmissions on the neighboring WLAN and the direction of MIMO beamforming to the isolated one of the associated transceiver nodes.

9. The wireless transceiver apparatus of claim 1, further comprising:

the plurality of transmit and receive components configured as one of a Wireless Access Point (WAP) transceiver and a station transceiver.

10. A method for operating a $1^{st}$ wireless transceiver node configured to support wireless communications with associated transceiver nodes on a selected communication channel on a wireless local area network (WLAN); and the method comprising:

sensing availability and unavailability of the selected communication channel, based on a relationship between a sensed signal level on the selected communication channel and a clear channel assessment (CCA) threshold level; and transmitting packets on the selected communication channel at a first power level from the $1^{st}$ wireless transceiver node to a selected one of the associated transceiver nodes on the WLAN responsive to the sensing of availability;

identifying unavailability of the selected communication channel arising from transmissions on a neighboring WLAN sharing the selected wireless communication channel; and selecting an isolated one of the associated transceiver nodes based on a proximity of the transceiver node to the $1^{st}$ wireless transceiver node; and calculating a backoff transmit power level substantially less than the first power level for transmissions from the $1^{st}$ wireless transceiver to the selected isolated transceiver node, which minimize interference with the transmissions on the neighboring WLAN.

11. The method for operating the $1^{st}$ wireless transceiver node of claim 10, wherein the identifying and calculating acts further comprise:

identifying a Received Signal Strength Indication (RSSI) of said transmissions from the neighboring WLAN at the $1^{st}$ wireless transceiver node;

estimating a transmit power level of the transmissions on the neighboring WLAN based on the identified RSSI; and limiting the backoff transmit power level to a level substantially less than said estimated transmit power level.

12. The method for operating the $1^{st}$ wireless transceiver node of claim 10, further comprising:

accumulating directional and signal strength information as to the associated transceiver nodes on the WLAN;

extrapolating at least the proximity of each associated transceiver node relative to the $1^{st}$ wireless transceiver node utilizing said accumulated information.

13. The method for operating the $1^{st}$ wireless transceiver node of claim 10, further comprising:

determining whether the calculated backoff transmit power level also provides a sufficient Signal-to-Noise Ratio (SNR) at the selected isolated transceiver node; and avoiding transmission from the $1^{st}$ wireless transceiver node to the selected isolated one of the associated transceiver nodes, responsive to a determination of insufficient SNR in the determining act.

14. The method for operating the $1^{st}$ wireless transceiver node of claim 10, further comprising:

transmitting at the backoff transmit power level both a header and a payload portion of each packet transmitted from the $1^{st}$ wireless transceiver node to the selected isolated transceiver node.

15. The method for operating the $1^{st}$ wireless transceiver node of claim 10, further comprising:

accumulating directional and signal strength information as to the associated transceiver nodes on the WLAN as well as transceiver nodes on the neighboring WLAN;

extrapolating locations of each node relative to the $1^{st}$ wireless transceiver node utilizing said accumulated information; and wherein the selecting act further comprises:

selecting the isolated one of the associated transceiver nodes based both on its proximity to the $1^{st}$ wireless transceiver node and its distance from a transmitting one of the transceiver nodes on the neighboring WLAN, utilizing the extrapolated locations.

16. The method for operating the $1^{st}$ wireless transceiver node of claim 10, further comprising:

accumulating directional and signal strength information as to the associated transceiver nodes on the WLAN as well as transceiver nodes on the neighboring WLAN;

extrapolating locations of each node relative to the $1^{st}$ wireless transceiver node utilizing said accumulated information; and wherein the selecting act further comprises:

selecting the isolated one of the associated transceiver nodes based further on a degree of antipodality between locations relative to the $1^{st}$ wireless transceiver node, of a transceiver node responsible for the transmissions on the neighboring WLAN and the isolated one of the transceiver nodes; utilizing the extrapolated locations.

17. The method for operating the $1^{st}$ wireless transceiver node of claim 10, further comprising:

determining a direction of the transmissions on the neighboring WLAN from a transmitting to a receiving one of the transceiver nodes; and wherein the selecting act further comprises:

selecting the isolated one of the associated transceiver nodes based further on a degree of antipodality between the direction of the transmissions on the neighboring WLAN determined in the determining act and a direction from the $1^{st}$ wireless transceiver node to a prospective isolated one of the associated transceiver nodes.

18. The method for operating the $1^{st}$ wireless transceiver node of claim 10, further comprising:

operating the $1^{st}$ wireless transceiver node as one of; a Wireless Access Point (WAP) transceiver and a station transceiver.

* * * * *